US008370795B1

(12) United States Patent
Sage

(10) Patent No.: US 8,370,795 B1
(45) Date of Patent: Feb. 5, 2013

(54) METHOD AND SYSTEM FOR EXPLAINING A VALUE OF A FIELD IN A FORM

(75) Inventor: Robert G. Sage, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1218 days.

(21) Appl. No.: 12/023,633

(22) Filed: Jan. 31, 2008

(51) Int. Cl.
*G06F 9/44* (2006.01)
(52) U.S. Cl. ......... 717/104; 717/105; 717/117; 717/120
(58) Field of Classification Search ........................ None
See application file for complete search history.

(56) References Cited

U.S. PATENT DOCUMENTS

| | | | | |
|---|---|---|---|---|
| 5,603,021 | A * | 2/1997 | Spencer et al. | 1/1 |
| 6,016,394 | A * | 1/2000 | Walker | 717/104 |
| 6,460,059 | B1 * | 10/2002 | Wisniewski | 715/212 |
| 7,107,277 | B1 * | 9/2006 | Mitra et al. | 1/1 |
| 7,379,935 | B1 * | 5/2008 | Mitra et al. | 1/1 |
| 7,539,974 | B2 * | 5/2009 | Beck et al. | 717/117 |
| 7,587,685 | B2 * | 9/2009 | Wallace | 715/854 |
| 7,835,893 | B2 * | 11/2010 | Cullick et al. | 703/6 |
| 2002/0023105 | A1 * | 2/2002 | Wisniewski | 707/503 |
| 2002/0095651 | A1 * | 7/2002 | Kumar et al. | 717/104 |
| 2004/0049436 | A1 * | 3/2004 | Brand et al. | 705/30 |
| 2004/0220790 | A1 * | 11/2004 | Cullick et al. | 703/10 |
| 2006/0080594 | A1 * | 4/2006 | Chavoustie et al. | 715/503 |
| 2006/0080595 | A1 * | 4/2006 | Chavoustie et al. | 715/503 |
| 2006/0161884 | A1 * | 7/2006 | Lubrecht et al. | 717/104 |
| 2007/0011650 | A1 * | 1/2007 | Hage et al. | 717/104 |
| 2008/0109740 | A1 * | 5/2008 | Prinsen et al. | 715/764 |
| 2008/0209391 | A1 * | 8/2008 | Iborra et al. | 717/105 |
| 2008/0209397 | A1 * | 8/2008 | Mohindra et al. | 717/120 |
| 2009/0183138 | A1 * | 7/2009 | Loos et al. | 717/105 |

OTHER PUBLICATIONS

Lonnie E. Moseley, Mastering Microsoft Office 97, second edition, ISBN 0-7821-1925-5, Sybex Inc., pp. 512-515, USPTO STIC EIC.*
Robert Biddle, "Spreadsheet Visualisation to Improve End-user Understanding", 2003 Australian Computer Society, 11 pages, <http://dl.acm.org/citation.cfm?id=857080.857093>.*
S. Noureddine, "Effective Values: An Approach for Characterizing Dependability Parameters", 2001 IEEE, pp. 62-170, <http://ieeexplore.ieee.org/stamp/stamp.jsp?tp=&arnumber=922418>.*

(Continued)

*Primary Examiner* — Thuy Dao
*Assistant Examiner* — Cuong V Luu
(74) *Attorney, Agent, or Firm* — Osha Liang LLP

(57) ABSTRACT

A method for explaining a value of a selected field includes obtaining a calculation tree for the selected field, where the calculation tree represents dependencies between the selected field and precedent data elements. The method further includes obtaining a first equation associated with the selected field from the calculation tree, and displaying a first value associated with the selected field and the first equation in symbolic form. The first equation includes a first precedent data element. The selected field is dependent on the first precedent data element. The method further includes receiving an expansion request for the first equation, obtaining a second equation associated with the first precedent data element, and displaying a second value associated with the first precedent data element and the second equation with the first value and the first equation in a dependency hierarchy.

25 Claims, 15 Drawing Sheets

OTHER PUBLICATIONS

Kamalasen Rajalingham, "Efficient methods for checking integrity: a structured spreadsheet engineering methodology", Feb. 2002, University of Greenwich, pp. 181-190, <http://ai.ijs.si/mezi/informatica/Informatica/Vol26/No2/Rajalingham.doc>.*

Hock Chuan Chan, "Spreadsheet Visualization Effects on Error Correction", Dec. 2004, HCI Research, pp. 90-94, <http://sighci.org/icis04_wksp/hci04_program_proceedings.pdf#page=102>.*

Richard Brath, "Excel Visualizer One Click WYSIWYG Spreadsheet Visualization", 2006 IEEE, 6 pages, <http://ieeexplore.ieee.org/stamp/stamp.jsp?tp=&arnumber=1648243>.*

Arthur Gretton, "Kernel Methods for Measuring Independence", Dec. 2005 Machine Learning Research, pp. 2075-2129, <http://dl.acm.org/citation.cfm?id=1046920.1194914&coll=DL&dl=GUIDE&CFID=159681329&CFTOKEN=37978065>.*

* cited by examiner

290
Paycheck Stub

Check #: To Print
Check Date: 01/28/2008 Edit...
Pay Period: 01/15/2008 - 01/28/2008

Pay to the Order of: Elly
Amount: $1,259.49
One thousand two hundred fifty-nine and 49/100 ********************

Address
Elly
57 Mill
Fill, CA 99988

Memo:
The Memo appears on employee paychecks. Hint: The pay period dates are also included.

Save    Save and Print ...    Cancel

| Compensation | | | | Edit... |
|---|---|---|---|---|
| Compensation Types | Quantity | Rate | Current Amount | YTD Amount |
| Hourly | 40:00 | 50.00 | 2000.00 | 8000.00 |
| | | Total: | $2,000.00 | |

| Employee-Paid Taxes | | Edit... |
|---|---|---|
| Taxes | Current Amount | YTD Amount |
| Federal Income Tax | 434.00 | 2128.00 |
| Medicare | 29.00 | 116.00 |
| Social Security | 124.00 | 496.00 |
| CA - Income Tax | 137.51 | 647.02 |
| CA - Disability | 16.00 | 64.00 |
| Total: | $740.51 | |

| Company-Paid Taxes | | Edit... |
|---|---|---|
| Taxes | Current Amount | YTD Amount |
| Medicare Company | 29.00 | 116.00 |
| Social Security Company | 124.00 | 496.00 |
| Federal Unemployment | 8.00 | 56.00 |
| CA - Unemployment | 20.00 | 140.00 |
| CA - Employment Training Tax | 1.00 | 7.00 |
| Total: | $182.00 | |

292 →   Add Payment or Deduction...

| Net Pay | Edit Net Pay |
|---|---|
| Total Net Pay: | $1,259.49 |

FIGURE 7

⊞ 8.00 "Federal Unemployment" Amount = 56.00 Total Tax Due (Q1) - 48.00 Total Tax Accrued (Q1) ⎬ 402 Line 1
(Note: Taxable wages clipped at 7000.00)

FIGURE 9A

⊟ 8.00 "Federal Unemployment" Amount = 56.00 Total Tax Due (Q1) - 48.00 Total Tax Accrued (Q1) ⎬ 402 Line 1
(Note: Taxable wages clipped at 7000.00)
 ⊞ 56.00 Total Tax Due (Q1) = 7000.00 Total Wage Base (Q1) * 0.8% Tax Rate ⎬ 404 Line 2
 ⊞ 48.00 Total Tax Accrued (Q1) = + 48.00 Q1 Total Accrued ⎬ 428 Line 18

FIGURE 9B

⊟ 8.00 "Federal Unemployment" Amount = 56.00 Total Tax Due (Q1) - 48.00 Total Tax Accrued (Q1) ⎬ 402 Line 1
(Note: Taxable wages clipped at 7000.00)
 ⊟ 56.00 Total Tax Due (Q1) = 7000.00 Total Wage Base (Q1) * 0.8% Tax Rate ⎬ 404 Line 2
  ⊞ 7000.00 Total Wage Base (Q1) = 6000.00 Q1 Wage Base + 1000.00 Paycheck Wage Base ⎬ 406 Line 3
  ⊞ 0.8% Tax Rate ⎬ 426 Line 16
 ⊞ 48.00 Total Tax Accrued (Q1) = + 48.00 Q1 Total Accrued ⎬ 428 Line 18

FIGURE 9C

| | Company Rate | Employee Rate | Wage Base Limit | Details |
|---|---|---|---|---|
| Federal Income Tax | None | Table | | Edit... |
| Medicare | 1.45% | 1.45% | | None Edit... |
| Social Security | 6.2% | 6.2% | As of: Jan 1, 2007 $97,500.00 ▲ Jan 1, 2008 $102,000.00 | Edit... |
| Federal Unemployment | 0.8% | None | $7,000.00 | Edit... |
| Advance Earned Income Credit | None | Table | | None Edit... |

440 — List Showing Federal Unemployment Tax Item

442 — Company Rate for Federal Unemployment

FIGURE 9G

METHOD AND SYSTEM FOR EXPLAINING A VALUE OF A FIELD IN A FORM

BACKGROUND

The typical computer system includes at least one processor and a memory device. Executing on the computer system are various types of applications, one such type is user applications. Many user applications are designed around the concept of forms, such as spreadsheets, databases, web pages, and tax applications. As used herein, a form is any type of document (Hyper-text Markup Language (HTML) page, spreadsheets, Extensible Markup Language (XML) document, text file, etc.) in which functionality is achieved through the use of fields. As used herein, a field in a form holds, displays, and/or stores a data value, which may be supplied (e.g., by the user, a regulatory agency, and/or an outside resource) or calculated using an equation.

Often, the interdependencies in a form are complicated. For example, a change in one field of a form, in a different document, or in a different form may affect other fields of the form. Sometimes the other fields may not intuitively appear linked to the changed field. For example, in a tax preparation or other financial application, a user may be unable to understand how input in one field relates to input in another field. Specifically, the user may only see the end result of one or more calculations, which are performed to generate the end result displayed in the field.

In order to understand the interdependencies of a document, users rely on static explanations in help files. The help files provide an explanation of the form that is directed to all users of application having the form.

SUMMARY

In general, in one aspect, the invention relates to a method for explaining a value of a selected field of a form, the method that includes obtaining a calculation tree for the selected field, wherein the calculation tree represents dependencies between the selected field and a plurality of precedent data elements, obtaining a first equation associated with the selected field from the calculation tree, and displaying a first value associated with the selected field and the first equation in symbolic form, wherein the first equation includes a first precedent data element of the plurality of data elements, and wherein the selected field is dependent on the first precedent data element. The method further includes receiving an expansion request for the equation associated with the selected field, obtaining a second equation associated with the first precedent data element from the calculation tree based on the expansion request, and displaying a second value associated with the first precedent data element and the second equation with the first value and the first equation in a dependency hierarchy.

In general, in one aspect, the invention relates to a system for explaining a value of a selected field of a form, the system that includes a calculation tree engine for generating a calculation tree for the selected field, wherein the calculation tree represents dependencies between the selected field and a plurality of precedent data elements, and a graphical user interface configured to obtain a first equation associated with the selected field from the calculation tree, and display a first value associated with the selected field and the first equation in symbolic form, wherein the first equation includes a first precedent data element of the plurality of data elements, and wherein the selected field is dependent on the first precedent data element. The calculation tree engine may be further configured to receive an expansion request for the equation associated with the selected field, obtain a second equation associated with the first precedent data element from the calculation tree based on the expansion request, and display a second value associated with the first precedent data element and the second equation with the first value and the first equation in a dependency hierarchy.

In general, in one aspect, the invention relates to a computer readable medium comprising computer readable program code embodied therein for causing a computer system to obtain a calculation tree for a selected field, wherein the calculation tree represents dependencies between the selected field and a plurality of precedent data elements, obtain a first equation associated with the selected field from the calculation tree, and display a first value associated with the selected field and the first equation in symbolic form, wherein the first equation includes a first precedent data element of the plurality of data elements, and wherein the selected field is dependent on the first precedent data element. The computer readable medium may further cause the computer system to receive an expansion request for the equation associated with the selected field, obtain a second equation associated with the first precedent data element from the calculation tree based on the expansion request, and display a second value associated with the first precedent data element and the second equation with the first value and the first equation in a dependency hierarchy.

Other aspects of the invention will be apparent from the following description and the appended claims.

BRIEF DESCRIPTION OF DRAWINGS

FIGS. 7, 8, and 9A-9G show an example in accordance with one or more embodiments of the invention.

DETAILED DESCRIPTION

Figure 1:
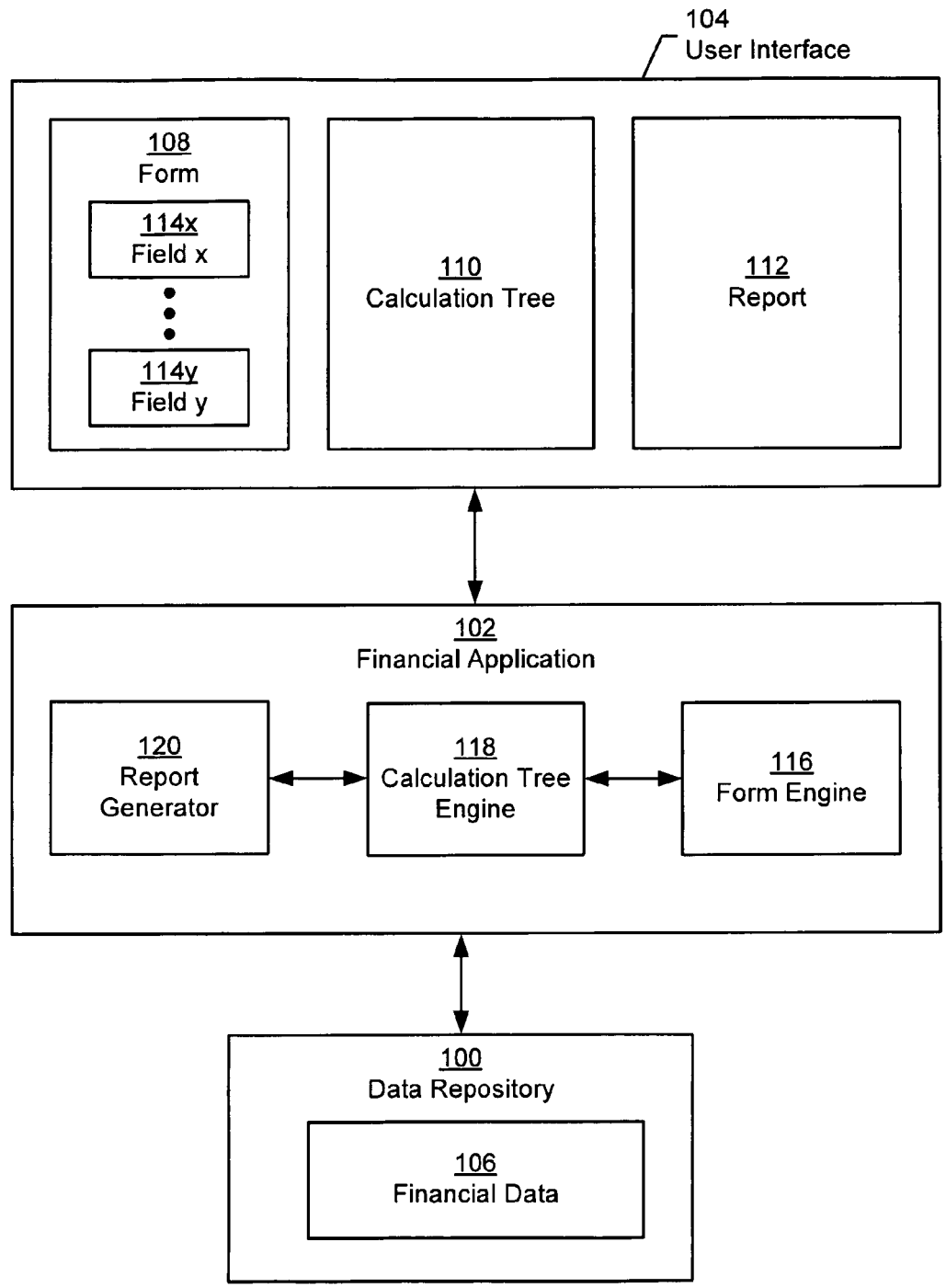
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for explaining a value of a field found within a form. Specifically, embodiments of the invention describe the derivation of the value of the field by allowing a user to interact with a calculation tree. The calculation tree describes the direct and indirect dependencies of the field with other data elements in a dependency hierarchy. The data elements in which a field is dependent may include all types of data, such as fields on the form, fields in other forms, external data (e.g., data describing regulations, data in the program, data obtained from a financial institution, and/or any other external source), or any other type of data. The calculation tree may be expanded or collapsed to allow the user to view as much or as little of the calculation tree as desired.

The user or a representative of the user may interact with the calculation tree. For example, the user may be a company and the representative of the user may be a financial officer that interacts with the calculation tree on behalf of the company. In another example, the user may be a minor and the representative may be a guardian. In another example, the user may interact with the calculation tree on behalf of himself or herself.

FIG. 1 shows a schematic diagram of a system in accordance with one or more embodiments of the invention. As shown in FIG. 1, the system includes a data repository (100), a financial application (102), and a user interface (104). Each of these components is described below.

In one or more embodiments of the invention, the data repository (100) is a storage unit, such as a file, file system, database management system, relational database, spreadsheet, program memory, or other system for storing financial data (106). The data repository (100) may be distributed across multiple vendors or financial institutions, stored with a single vendor or financial institution, or stored on the same computer system operated by the user. For example, the data repository (100) may be accessible using an Internet, Intranet, or from a local storage device.

In one or more embodiments of the invention, the financial data (106) is data related to the finances of the user. For example, the financial data (106) may include financial transaction data (e.g., data about particular income, expenses, and/or other data of the user), status information (e.g., married, homeowner, age, and/or any status information), account information (e.g., name of financial accounts, data defining how to access the account, current balance, and/or other account details), data from regulations (e.g., tax rate, wage limit, and other such regulatory data), data from the operation of the application (e.g., type of form used), and any other type of data.

Continuing with FIG. 1, a user interface (104) includes functionality to interact with the user. Specifically, a user interface (104) includes a form (108), a calculation tree (110), and a report (112). The form (108) and the calculation tree (110) may be viewed simultaneously in the user interface (104) or each may only be viewed separately.

In one or more embodiments of the invention, a form (108) is any type of document (HTML page, XML document, test file, spreadsheets, etc.) in which functionality is achieved through the use of fields (e.g., field x (114$x$), field y (114$y$)). A field (e.g., field x (114$x$), field y (114$y$)) in a form (108) is a region of the form (108) that is reserved for viewing, entering, calculating, and/or modifying a particular type of data. For example, the field may be reserved for the user's name, address, age, occupation, gross income, net income, cost of a purchase, and other such types of data.

As discussed above, in one or more embodiments of the invention, a calculation tree (110) is a visual tool that describes the direct and indirect dependencies the field has on other data elements both on and off of the form. Specifically, a calculation tree describes both direct and indirect dependencies for a specified field in the form. Although not shown in FIG. 1, multiple calculation trees may exist because the form may have multiple fields and each field has a separate calculation tree in accordance with one or more embodiments of the invention. The calculation tree (110) shows the dependencies according to a dependency hierarchy. An example of the calculation tree is discussed below and shown in FIG. 3.

In one or more embodiments of the invention, a report (112) is a description of supporting financial data. Specifically, the report (112) describes one or more individual supporting financial data elements that upon aggregation represent a data element in the calculation tree (110). For example, the report (112) may be a listing of financial transactions in a bank account, a graph or a chart showing financial data, or any other description of financial data. Further, the report (112) may be static or interactive.

A financial application (102) is connected to the data repository (100) in accordance with one or more embodiments of the invention. The financial application (102) may include functionality to assist users in financial management. For example, a financial application may be an accounting application, a tax preparation application, a payroll application, an invoicing application, or any other type of financial application. The financial application (102) may execute locally (e.g., on the computer system or mobile device of the user) or remotely, such as from a server. In one or more embodiments of the invention, the financial application (102) includes a report generator (120), a form engine (116), and a calculation tree engine (118).

In one or more embodiments of the invention, the report generator (116) includes functionality to generate a report (112). For example, the report generator may be a portion of the financial application that lists financial transactions or aggregates financial data.

In one or more embodiments of the invention, the form engine (116) includes functionality to perform the backend operations necessary to allow the user to use the form. For example, the form engine (116) may include functionality to generate the form (108), populate calculated fields, and store financial data (106) from the form (108) in the data repository (100). In one or more embodiments of the invention, the form engine (116) includes functionality to maintain properties of each data element in the form (108) and directly or indirectly used by the form (108). The data elements in the form include the fields of the form. The properties may include a value, a label, an annotation, an equation, or any other such data for the data element. The value of the data element may be defined (e.g., by the user, a regulatory agency, or other outside resource) or may be the result of a calculation. The calculation may be based on the equation that simultaneously encompasses multiple operations or a single operation.

In one or more embodiments of the invention, a calculation tree engine (118) is connected to the form engine (116) and includes functionality to receive a selection of a field of the form and display a calculation tree based on the selected field.

Figure 2:
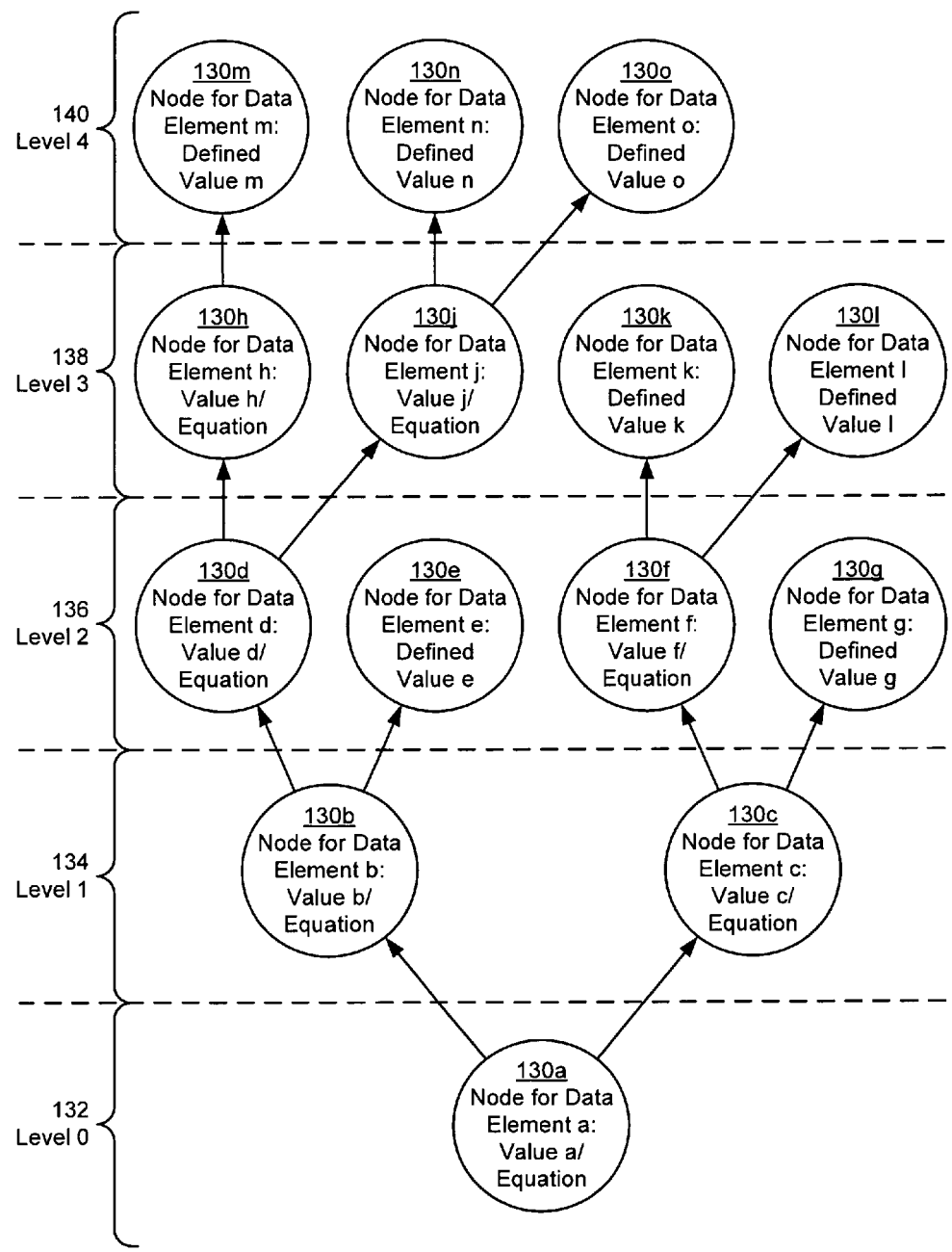
FIGS. 2 and 3A-3B show an example in accordance with one or more embodiments of the invention

FIG. 2 shows an example internal representation of a calculation tree (110 in FIG. 1) in accordance with one or more embodiments of the invention. One of ordinary skill in the art will appreciate that the example shown in FIG. 2 is intended for exemplary purposes only and are not intended to limit the scope of the invention.

As shown in example FIG. 2, an internal representation of calculation tree includes multiple data elements (130$a$-$o$) represented by nodes in a dependency hierarchy. The nodes for the data elements (130$a$-$o$) in the calculation tree may include a value and an equation or may include a defined value. If a data element includes a value and an equation, then the data element is dependent on other data elements.

In one or more embodiments of the invention, the nodes for the data elements (130$a$-$o$) in the calculation tree may be considered to be in different levels (e.g., level 0 (132), level 1 (134), level 2 (136), level 3 (138), level 4 (140)) according to the dependencies between the data element. Considering nodes as being in different levels is used for explanatory purposes below. Data elements represented by nodes in a level with a higher number are precedent to data elements represented by nodes in the level(s) with the lower number(s). Likewise, data elements represented by nodes that are not defined values in a lower numbered level(s) are dependent on data elements represented by nodes in a higher numbered level. When a data element in a node directly precedes a data element in another node (i.e., a reference to the data element in the other node exists), then the data element is in a child node of the other node. Similarly, the other node is a parent node to the child node.

In the example shown in FIG. 2, the node for data element b (130b) in level 1 (134) is dependent on, and therefore a parent node to the nodes for data element d (130d) and data element e (130e) in level 2 (136). Similarly, the node for data element d (130d) in level 2 (136) is dependent on, and therefore a parent node to the node for data element h (130h) and data element j (130j) in level 3 (138). Therefore, data element b (130b) is indirectly dependent on data element j (130j). In other words, the nodes for data element d (130d) and data element e (130e) in level 2 (136) are precedent to, and therefore children nodes to the node for data element b (130b) in level 1 (134). Likewise, the node for data element h (130h) and data element j (130j) in level 3 (138) are precedent on, and therefore children nodes to the node for data element d (130d) in level 2 (136).

Although not shown in FIG. 2, the internal calculation tree may also include a report node. A report node includes data for generating a report and computing a total. For example, a report node may include a query to generate a report, such as a date range, a name, a tax type, or other such information; and identify the report column to total, such as transaction line amount or taxable wages. The report node may include a property for the total value of the report when generated.

In one or more embodiments of the invention, multiple data elements may be dependent on the same data element (i.e., precedent data element). For example, each of the multiple data elements may have an equation that depends on the value of the precedent data element. In such a scenario, calculation tree may be a graph with a connection between the multiple data elements and the precedent data element.

One skilled in the art will appreciate that the internal representation of the calculation tree may be implicitly defined. For example, the calculation tree may be defined through the definition of the form (in which each field of the form identifies data elements upon which the field is dependent and/or precedent). Alternatively, the calculation tree may be defined explicitly as a separate data structure distinct from the form.

Figure 3A:
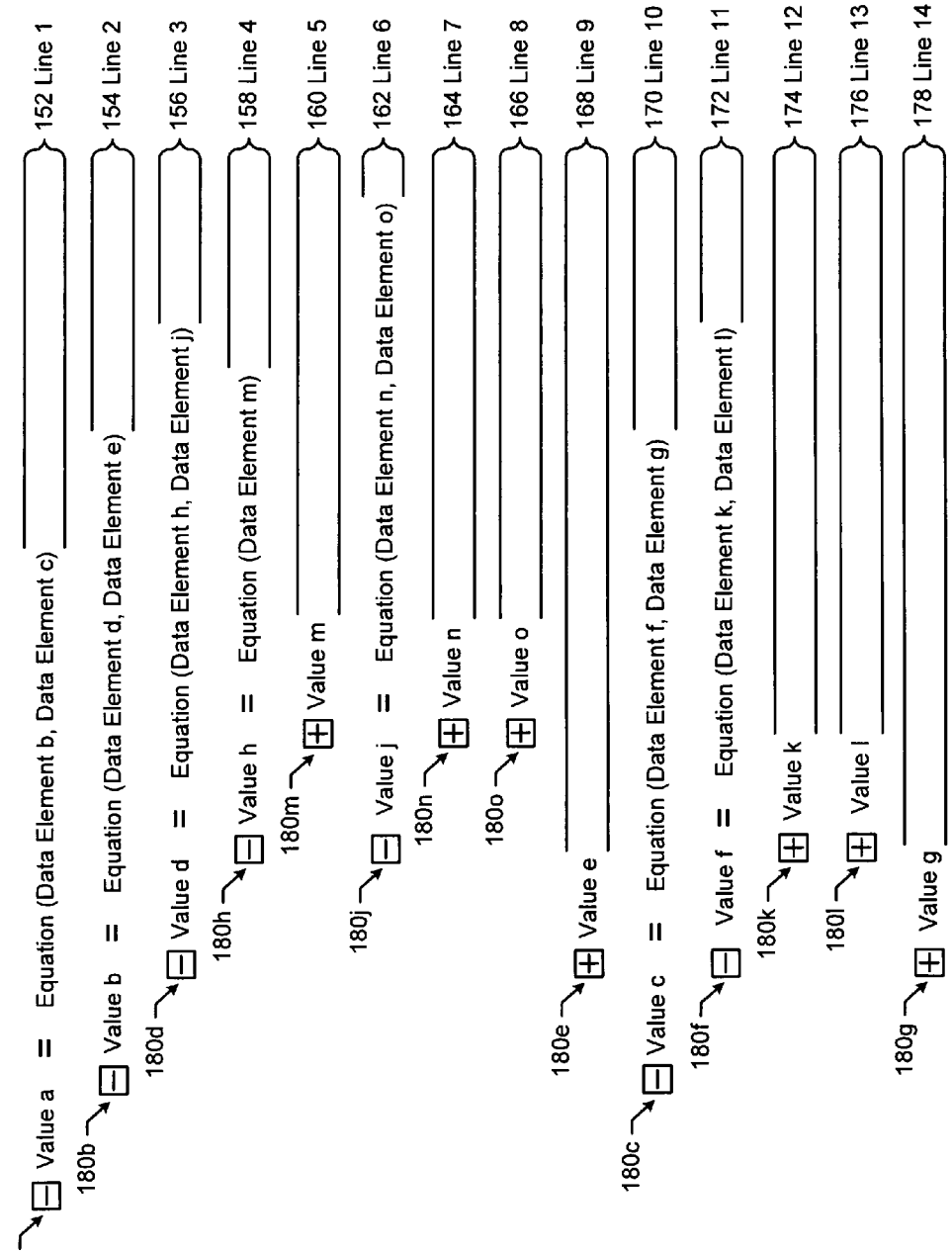
Figure 3B:
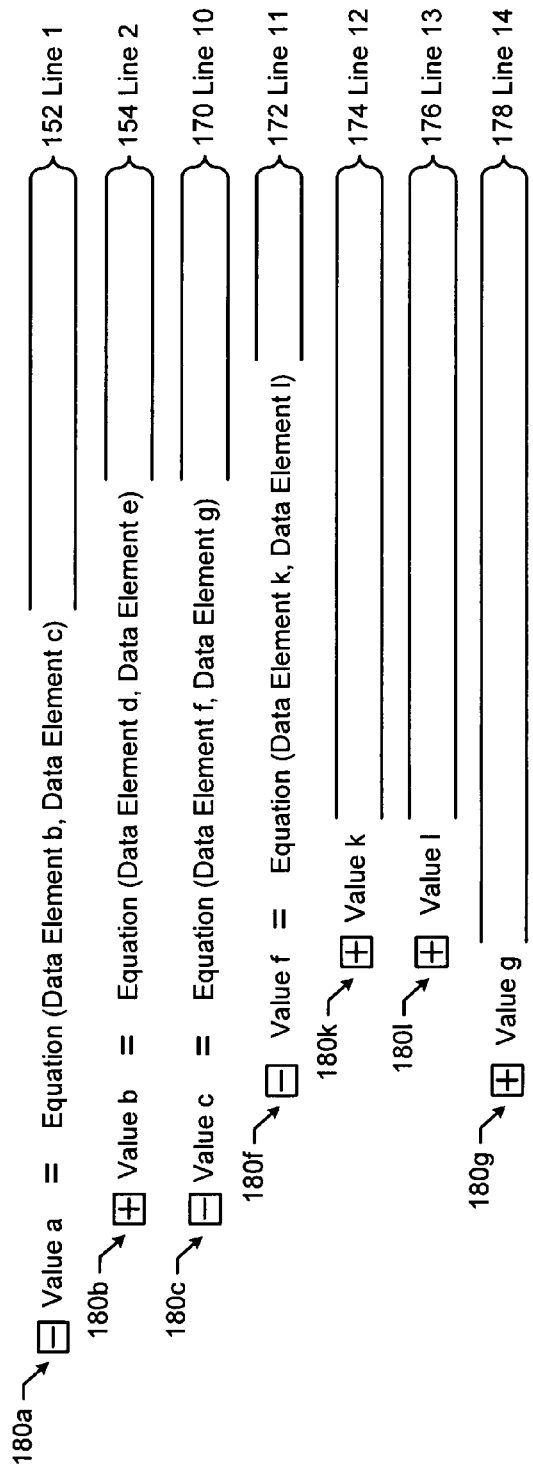

FIGS. 3A-3B shows an example calculation tree that is displayed in a dependency hierarchy for the user in accordance with one or more embodiments of the invention. One should appreciate that the examples shown in FIGS. 3A-3B are intended for exemplary purposes only and are not intended to limit the scope of the invention.

As shown in FIG. 3A, the dependency hierarchy describes dependencies between the data elements as described in the internal representation of the calculation tree shown in FIG. 2. Specifically, data elements in the internal representation of the calculation tree shown in FIG. 2 are described in FIG. 3A.

Each line (e.g., lines 1-14 (152-178)) in FIG. 3A includes a value of the data element. Further, lines that represent calculated data elements (e.g., lines 1-4 (152-158), line 6 (162), line 10 (170), line 11 (172), also include an equation for calculating the value of the data element. While FIG. 3A, does not show the explicit equation, one skilled in the art will appreciate that the equation is a combination of one or more operators and one or more data elements as parameters. In one or more embodiments of the invention, the operators of the equation for the data element are displayed in symbolic form. Specifically, in one or more embodiments of the invention, rather than using "plus", "minus", "multiplied by", and "equals", the displayed operators include "+", "−", "×", "=" and other such symbols. Those skilled in the art will appreciate that the displayed operators may also include "min", "max", and other such keywords.

In one or more embodiments of the invention, adjacent to the values of the data elements in the equations is a label and/or an annotation describing the value. Thus, the user is able to identify what the value represents. Further, in one or more embodiments of the invention, portions of the calculation tree (e.g., the values, the operators, the labels or annotations, etc.) may appear accentuated to the user. For example, the portions may appear highlighted, bold, a different color, in a different font size, or shown in any other manner to accentuate the portion with respect to the remaining calculation tree.

The indentation between the lines represents the dependencies between the data elements according to the calculation tree. For example, as shown in FIG. 3A, value a (which corresponds to data element a and is shown in line 1 (152)) has an equation using data element b and data element c. Line 2 (154) and line 9 (168) are displayed at the next level of indentation after the level of indentation for line 1 (152) holding value a. Line 2 (154) shows the value for data element b and the equation for data element b. Similarly, line 9 (168) shows the value for data element c and the equation for data element c. Thus, a user viewing the calculation tree is able to identify the dependencies between data elements and view the equations that describe how the data elements are dependent.

Adjacent to each line is a button (180a-o) that allows the user to show (i.e., reveal or generate) or hide (i.e., conceal or remove) levels in the calculation tree. When the button (180a-o) shows a "+" sign then the user may select the button to expand the portion of the calculation tree that is displayed or to view a report. When the button shows a "−" sign, then the user may select the button to collapse the portion of the calculation tree that is displayed.

FIG. 3B shows an example calculation tree after the button (180b) for line 2 (154) is selected. As shown in FIG. 3B, the button (180b) changes from a "−" sign to a "+" sign and lines 3-9 are removed from the display. By hiding the lines 3-9, for example, the user may see a condensed view of the remaining data elements shown in the calculation tree. The user may also select the button (180b) shown in FIG. 3B to return to the view of the calculation tree shown in FIG. 3A.

Figure 4:
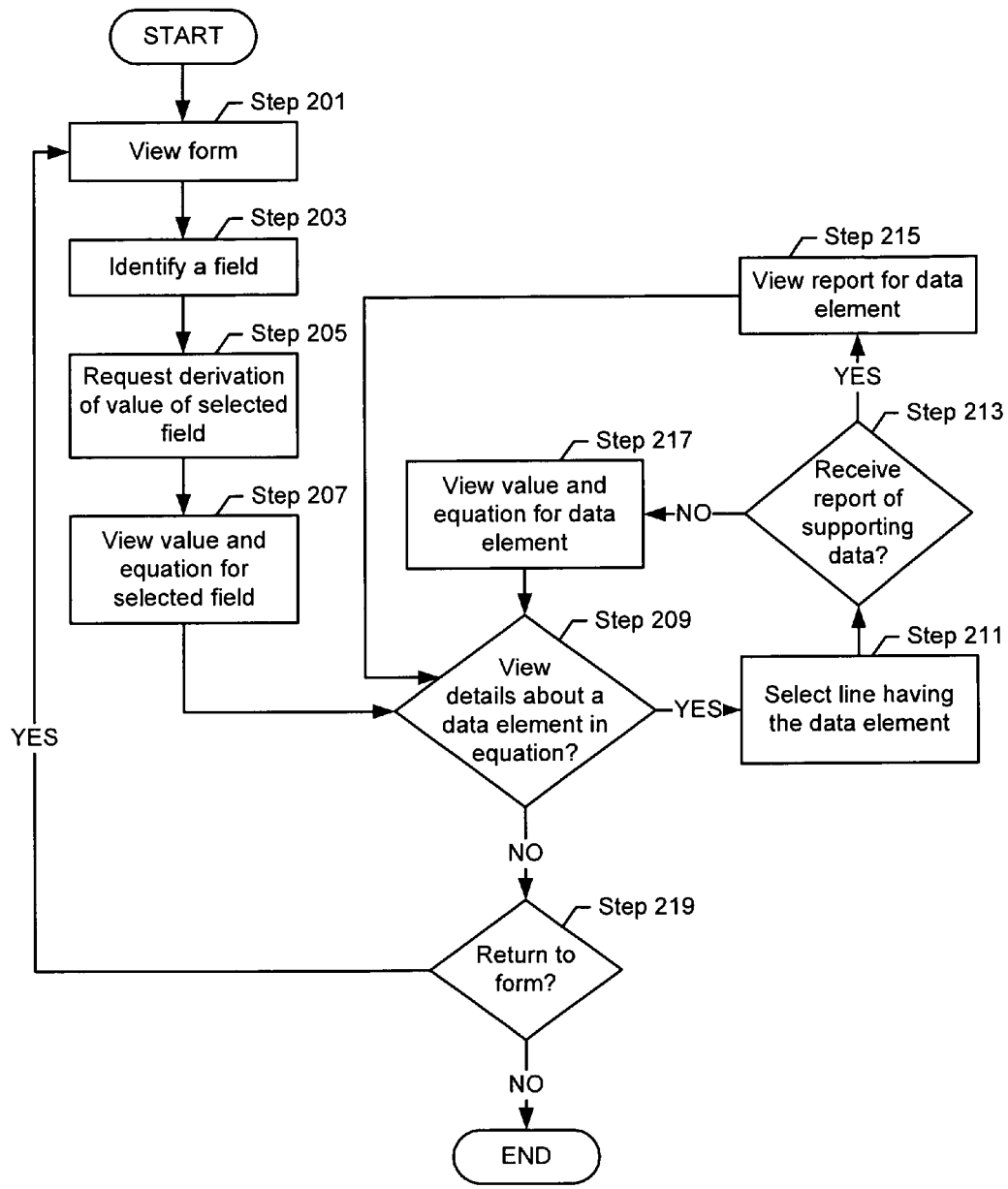
FIGS. 4-6 show flowcharts in accordance with one or more embodiments of the invention.
Figure 5:
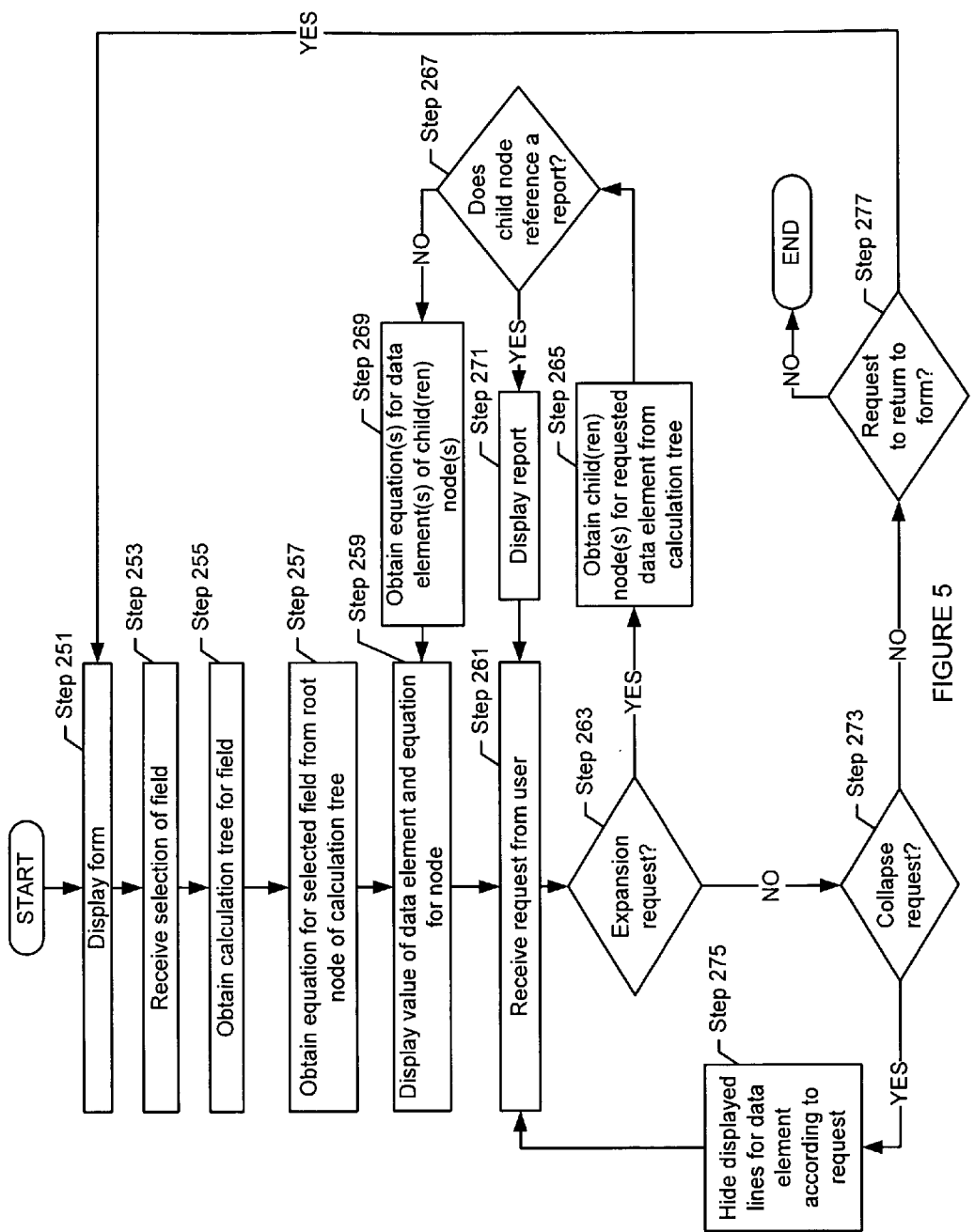
Figure 6:
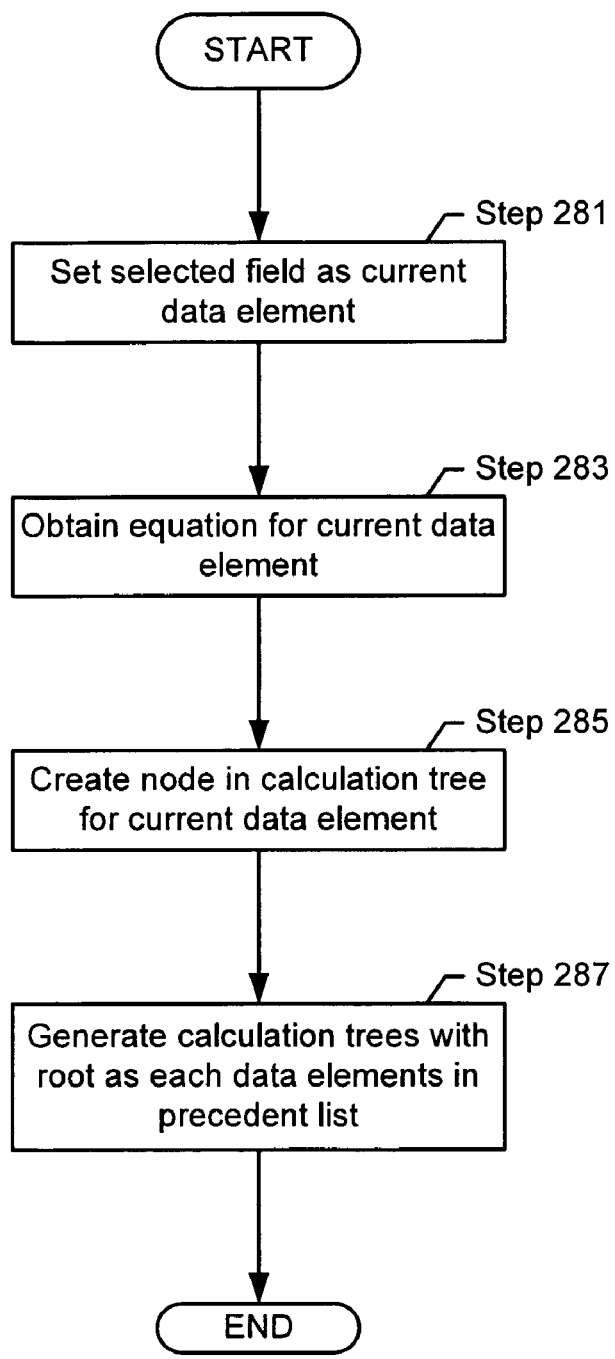

FIGS. 4-6 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

FIG. 4 shows a flowchart of a method for a user to understand the value calculated in a field of a form. Initially, the user may view a form (Step 201). For example, the user may have received a previously filled form or may be submitting data to the form. As the user is viewing the form, the user may identify the field (Step 203). The field that the user identifies may have a calculated value which the user does not understand. For example, the user may be surprised at the value or wonder how the value is calculated.

Accordingly, the user requests a derivation of the value of the selected field (205). To request the derivation, the user may select the identified field and use a menu button to request the derivation. Alternatively, in one or more embodiments of the invention, the user may select a button associated with the field to select the field. Alternatively, the user may use a shortcut key on a keyboard or keypad to request the derivation of the field. One skilled in the art of user interfaces will appreciate that many different mechanisms exist to allow a user to submit a command, such as requesting a derivation of a field. Any number of these mechanisms known in the art may be used without departing from the scope of the invention.

After requesting the derivation of the field, the user views a value and an equation for the selected field (Step 207). In one or more embodiments of the invention, the first level of the calculation tree having the value of the selected field and the equation used to select the value is displayed for the user.

Rather than initially viewing only a single line of the calculation tree, the entire calculation tree may be initially displayed for the user in a graphical user interface (GUI). The user may then select to collapse portions of the initially displayed calculation tree. Within the GUI, the user may view the displayed calculation tree in the same window as the form, such as in a different pane of the window, or in a different window in accordance with one or more embodiments of the invention.

While viewing the value and the equation for the selected value, the user may make a determination whether to view details about data elements in the equation (Step 209). For example, the user may be uncertain as to how a data element in the equation is calculated.

If the user determines to view details about the data element that is displayed, then the user selects the line having the data element (Step 211). In one or more embodiments of the invention, the line may be a line with an equation, a line that when selected directs a user to a report, or a line that describes a defined value (e.g., "8% tax rate"). A user may select any of the aforementioned lines in accordance with one or more embodiments of the invention. In one or more embodiments of the invention, the selection of the line may include selecting the box next to the line to expand the data elements in the equation.

In one or more embodiments of the invention, a user may receive a report showing supporting data (Step 213). For example, a report may be displayed for the user. Thus, the user may view the report for the data element to determine how the data element is calculated (Step 215). When the user is finished viewing the report, the user may return to view the calculation tree.

If a report of supporting data is not received, then the user views the value and the equation for the data element (Step 217). In one or more embodiments of the invention, the value and the equation for the data element are displayed in a separate line of the displayed calculation tree.

In one or more embodiments of the invention, when the calculation tree is displayed, the user may make a determination whether to return to the form (Step 219). If the user decides to return to the form, then the form is displayed in the GUI and the user views the form (Step 201).

FIG. 5 shows a flowchart of a method for explaining the meaning of a value of a field in a form from within a financial application. Initially, the form is displayed (Step 251). The form may be displayed within a GUI on virtually any type of computing device. While the form is displayed, the financial application receives a selection of a field in the form (Step 253). In one or more embodiments of the invention, the selection indicates that the user desires a derivation of the selected field. As discussed above, various mechanisms may be used for the financial application to receive a command to show a derivation of the selected field.

Based on the command, the financial application obtains a calculation tree for the selected field (Step 255). Multiple methods exist for the financial application to obtain the calculation tree. For example, the financial application may generate the calculation tree. Generating a calculation tree is described below and in FIG. 6. In another example, the financial application may obtain the calculation tree by obtaining equations from the form and the properties of the data elements while the user is requesting the expansion of the displayed calculation tree. In such scenario, the internal representation of the calculation tree is implicitly defined in the form.

The financial application obtains the equation for the selected field from the root node of the calculation tree (Step 257). The root node of the calculation tree is the node for the field in accordance with one or more embodiments of the invention. Based on a property representing an operation in the root node, an equation is identified for the root node.

Accordingly, the value and the equation for the data element are displayed (Step 259). At the first iteration, the data element is the selected field. As the user interacts with the calculation tree, the data element may be the selected field or any data element that is precedent to the selected field. Displaying the data element may include determining the level in the calculation tree of the data element and indenting the data element according to the level in the calculation tree. Indenting the data element may be performed using a variety of mechanisms known in the art of user interfaces.

Further, a request is received from the user (Step 261). In one or more embodiments of the invention the request may be an expansion request, a collapse data element request, a request to return to the form, or a request to end the financial application. Accordingly, a determination is made whether the request is an expansion request (Step 263).

If the request is an expansion request, then the user has requested a derivation of a data element in the calculation tree. Accordingly, the children nodes, or child node, of the node for the requested data element are obtained from the calculation tree (Step 265). Since each node in the internal representation of the calculation tree references children nodes, obtaining the children node may be performed by following the reference. For example, if the calculation tree is implicitly defined in the form, then the equation stored at the field includes a reference to other data elements by location or name. Accordingly, using methods known in the art, the name or location may be used to obtain the next data element. Alternatively, if the calculation tree is explicitly defined, then each node in the calculation tree includes an explicit reference to any children nodes of the node. Thus, obtaining the children nodes may be performed by following the reference.

Further, a determination is made whether an obtained child node references a report (Step 267). Specifically, a determination is made whether the child node includes information to generate and display a report. If the child node references a report, then the report is displayed (Step 271). For example, the financial application may navigate the user away from the calculation tree and to a window showing the report. Generating and showing a report of the supporting data may be performed using techniques known in the art for reporting financial data.

Alternatively, if an obtained child node is not linked to a report, then equations of the data elements of all obtained children nodes are obtained (Step 269). An equation of the data element is obtained in a manner similar to obtaining the equation for the field in Step 257. Further, the value and the equation of the data element for all children nodes are displayed. Thus, the user may view how the data elements of the requested line were calculated.

Returning to Step 263, if the request from the user is not an expansion request, then a determination is made whether the request is a collapse request (Step 273). If the request is a collapse request, then displayed lines for data elements are hidden according to the request (Step 275). Specifically, the line that is selected to collapse is identified. Next, the derivation of the precedent data elements to the line is hidden from view. Hiding the precedent data elements may be performed by updating the affected portion of the display.

If the request is not a collapse request, then a determination is made whether the request is to return to the form (Step 277). If the determination is made to return to the form, then the form is displayed (Step 251). Thus, the user may continue to interact with the form.

FIG. 6 shows a flowchart of a method for generating a calculation tree in accordance with one or more embodiments of the invention. While FIG. 6 shows one method for generating the calculation tree, those skilled in the art will appreciate that other methods may be performed without departing from the scope of the invention. Initially, the selected field is set as the current data element (Step 281). Next, an equation for the current data element is identified (Step 283). As discussed above, each data element may have properties. Within the properties may be an equation that references other data elements. Accordingly, the equation is obtained from the properties.

Further, a node in the calculation tree is created for the current data element (Step 285). Specifically, the properties of the data element are stored in a new node of the calculation tree.

A calculation tree is generated for each data element directly precedent to the current data element (Step 287). A data element is precedent to the current data element when the data element is referenced in the equation for the data element. For example, by parsing the equation the referenced data elements may be identified. Because the referenced data elements have a value that must be computed before the value for the current data element, the referenced data elements must precede the current data element. In one or more embodiments of the invention, if the current data element is an aggregation of supporting data, then a node may be created in the calculation tree for generating a report. In one or more embodiments of the invention, if the current data element is a defined value, then a node in the calculation tree may be created for the defined value. In either scenario, no additional calculation trees are generated because the current data element is not dependent on any other data element. Generating the calculation trees may be performed recursively as defined in FIG. 6.

For example, consider the scenario in which the current data element is resultNode. resultNode is calculated by CalcNode resultNode=Calc.multiply (wagesNode, rateNode). In such scenario, a node in the calculation tree is created for resultNode. An operation property for resultNode is multiply. Further, a calculation tree may be created for both wagesNode and rateNode. The resultNode includes a reference to the calculation tree for wagesNode and the calculation tree for rateNode. Thus, the calculation tree may be recursively generated. Those skilled in the art will appreciate that the calculation tree may be alternatively iteratively generated.

FIGS. 7, 8, and 9A-9G show an example in accordance with one or more embodiments of the invention. One should appreciate that the examples shown in FIGS. 7 and 8A-8F are intended for exemplary purposes only and are not intended to limit the scope of the invention.

For the following example, consider the scenario in which a payroll clerk of a company is viewing a company version of a paycheck stub. FIG. 7 shows an example paycheck stub (290) that the payroll clerk may be viewing. The paycheck stub describes a paycheck directly deposited into an employee's account. While reviewing the paycheck stub, the payroll clerk may question the amount deducted on a tax line. In particular, the tax line is federal unemployment tax (292). Accordingly, the payroll clerk may select the field for the federal unemployment tax item (292) and request a calculation tree for the selected field.

Figure 8:
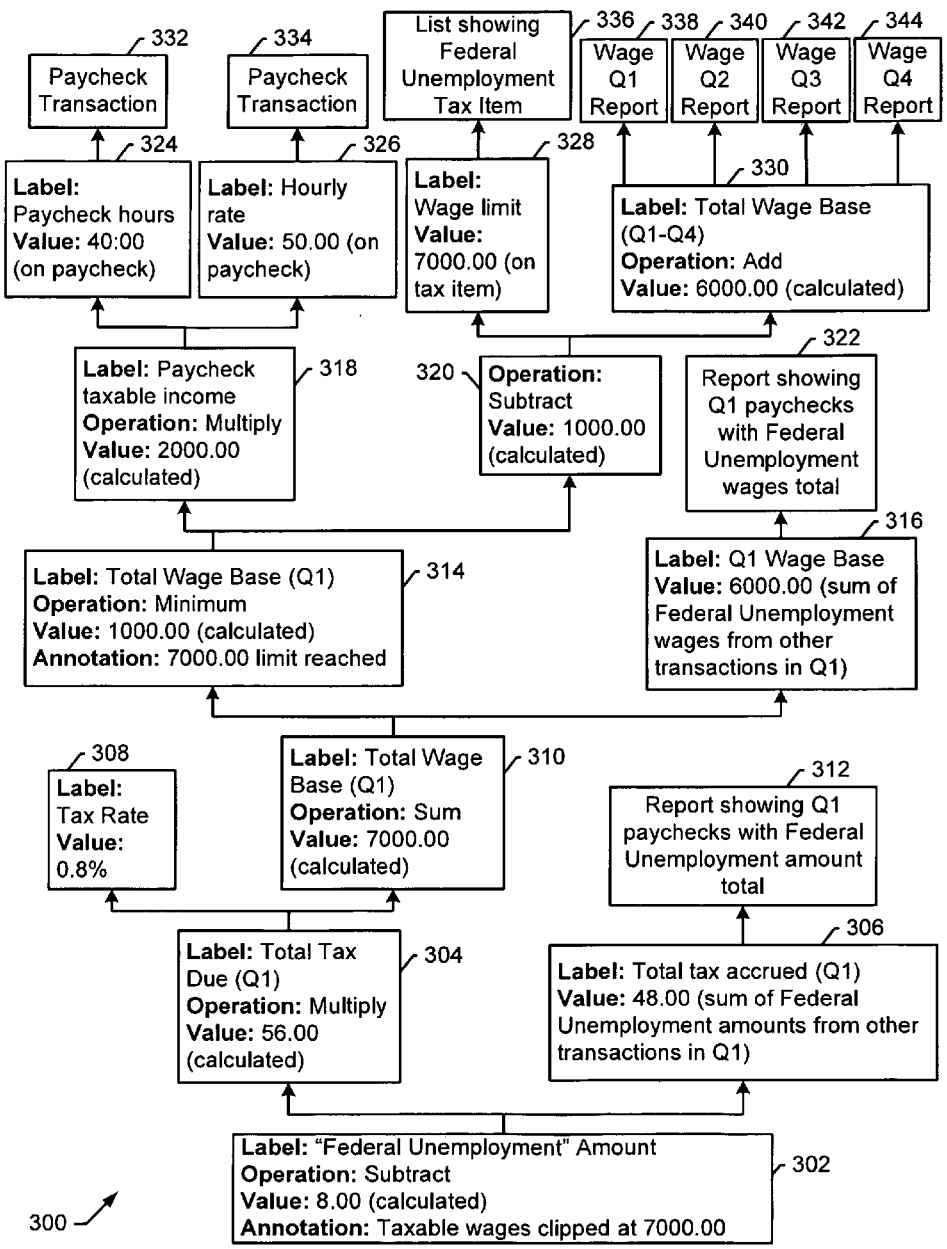

FIG. 8 shows an internal representation of a calculation tree (300) for calculating the federal unemployment tax item. As shown in FIG. 8, the root node (302) is for the data element of the federal unemployment amount. The data element of the root node has multiple properties such as the label identifying the data element (i.e., "federal unemployment amount"), the operation to perform to obtain the value for the data element (i.e., "subtract"), the value of the data element (i.e., $8.00), and an annotation (i.e., "taxable wages clipped at 7000.00"). The operation on the root node indicates to subtract one child node from the other child node. The value of performing the operation is $8.00.

By following the references to the children nodes of the root node (302), one child node (304) is for the data element describing the total tax due in the first quarter (i.e., Q1). The second child node (306) describes the total tax accrued in the first quarter. The child node (312) for the second child node (306) is a node that indicates the payroll clerk is to be directed to a report showing the first quarter paychecks with the federal unemployment amount total.

Returning to the first child node (304), the first child node has an operation property of multiplying the children nodes of the first child node (304). The children nodes are for a data element of the tax rate (308), which is a defined value, and for a data element describing the total wage base for the first quarter (310).

As indicated in the internal representation of the calculation tree, the node (310) for the total wage base in the first quarter data element has children nodes of the total wage base for the first quarter (314) and the first quarter wage base (316). The child node (322) of the node (316) for the first quarter wage base indicates that the payroll clerk is to be directed to a report showing the first quarter paychecks with the federal unemployment wages total.

Returning to node (314) for the total wage base for the first quarter data element, the children nodes include a node (318) for a paycheck taxable income (318) and a node (320) for calculating a value of a data element. The node for the paycheck taxable income has nodes for identifying the total paycheck hours (324) and a node for identifying the hourly rate for the employee (326). Both nodes refer to respective nodes for viewing a paycheck transaction (332, 334) showing the paycheck with the total paycheck hours and the hourly rate.

Returning to the node for the subtract operation data element (320), the subtract operation data element (320) includes a node (328) for identifying a wage limit, which references a node (336) for displaying a list showing the federal unemployment tax item, and a node (330) for identifying the total wage base. The node (330) for identifying the total wage base references nodes for the wages for the first quarter report (338), the second quarter report (340), the third quarter report (342), and the fourth quarter report (344). After generating the internal representation of the calculation tree, the calculation tree may be displayed for the payroll clerk.

Figure 9D:
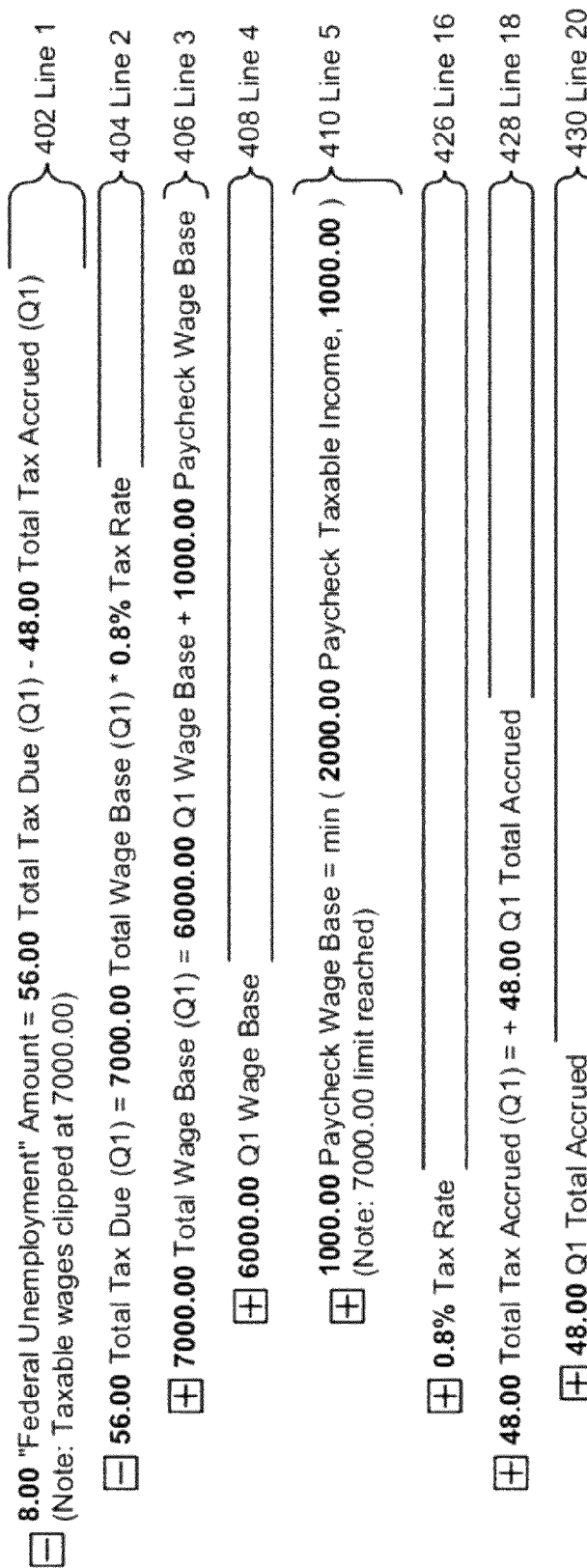

Continuing with the example, FIGS. 9A-9G show an example of how the payroll clerk may interact with the calculation tree of FIG. 8. In FIGS. 9A-9G and in the description below, lines of the calculation tree are numbered according to the lines displayed in the complete calculation tree for explanatory purposes. FIG. 9A an example of the calculation tree when the payroll clerk initially selects the derivation of the federal unemployment amount. As shown in FIG. 9A, data from the root node and the children nodes of the root node of the internal representation of the calculation tree are displayed in line 1 (402) of the calculation tree. Specifically, the payroll clerk can identify from line 1 (402) that the value of the federal unemployment amount is $8.00 and depends on the total tax due for the first quarter, which has a value of $56.00, and total tax due, which has a value of $48.00. The payroll clerk is also able to tell that taxable wages are clipped at $7000.00.

Next, consider the scenario in which the payroll clerk would like to determine how the total tax due for the first quarter and the total tax accrued for the first quarter are calculated. Accordingly, the payroll clerk may select the button next to line 1 (402) to view the desired calculations. FIG. 9B shows the example calculation tree after the payroll clerk selects the button next to line 1 (402) in accordance with one or more embodiments of the invention. By expanding line 1 (402) of the displayed calculation tree, the payroll clerk may view line 2 (404) and line 18 (428) of the calculation tree. From line 2 (404), the payroll clerk may identify that the total tax due for the first quarter is equal to the total wage base for the first quarter (i.e., $7000.00) multiplied by the tax rate (i.e., 8%). The payroll clerk may also identify that the total tax accrued for the first quarter is $48.00 based on line 18 (428).

Next, consider the scenario in which a payroll clerk would like to receive more information about the total wage base in line 2 (404). Accordingly, the payroll clerk may expand line 2 (404) by selecting the button next to line 2 (404) to display the calculation tree shown in FIG. 9C in accordance with one or more embodiments of the invention. As shown in FIG. 9C, the expansion of line 2 shows line 3 (406) and line 16 (426). The payroll clerk may identify from line 3 (406) that the total wage base for the first quarter is equal to the first quarter wage base (i.e., $6000.00) added to the paycheck wage base (i.e., $1000.00).

The payroll clerk may continue the inquiry into the federal unemployment amount by selecting the buttons next to line 3 (406) and line 18 (428). FIG. 9D shows the resulting calculation tree after the payroll clerk selects the buttons next to line 3 (406) and line 18 (428) in FIG. 9C in accordance with one or more embodiments of the invention. As shown in FIG. 9D, after expanding line 3 (406) and line 18 (428), the payroll clerk may view line 4 (408), line 5 (410), and line 20 (430). From line 5, the payroll clerk may identify that the paycheck wage base (i.e., $1000.00) in line 3 (406) is the minimum of the paycheck taxable income (i.e., $2000.00) and $1000.00. Further, the payroll clerk may identify that the $2000.00 represents forty hours multiplied by the hourly rate (i.e., $50.00). While viewing FIG. 9D, the payroll clerk may question the derivation of the $1000.00 in line 5 (410) and decide that line 20 (430) shows redundant information. Accordingly, the payroll clerk may expand line 5 (410) to show the derivation of $1000.00 and collapse line 18 (428).

Figure 9E:
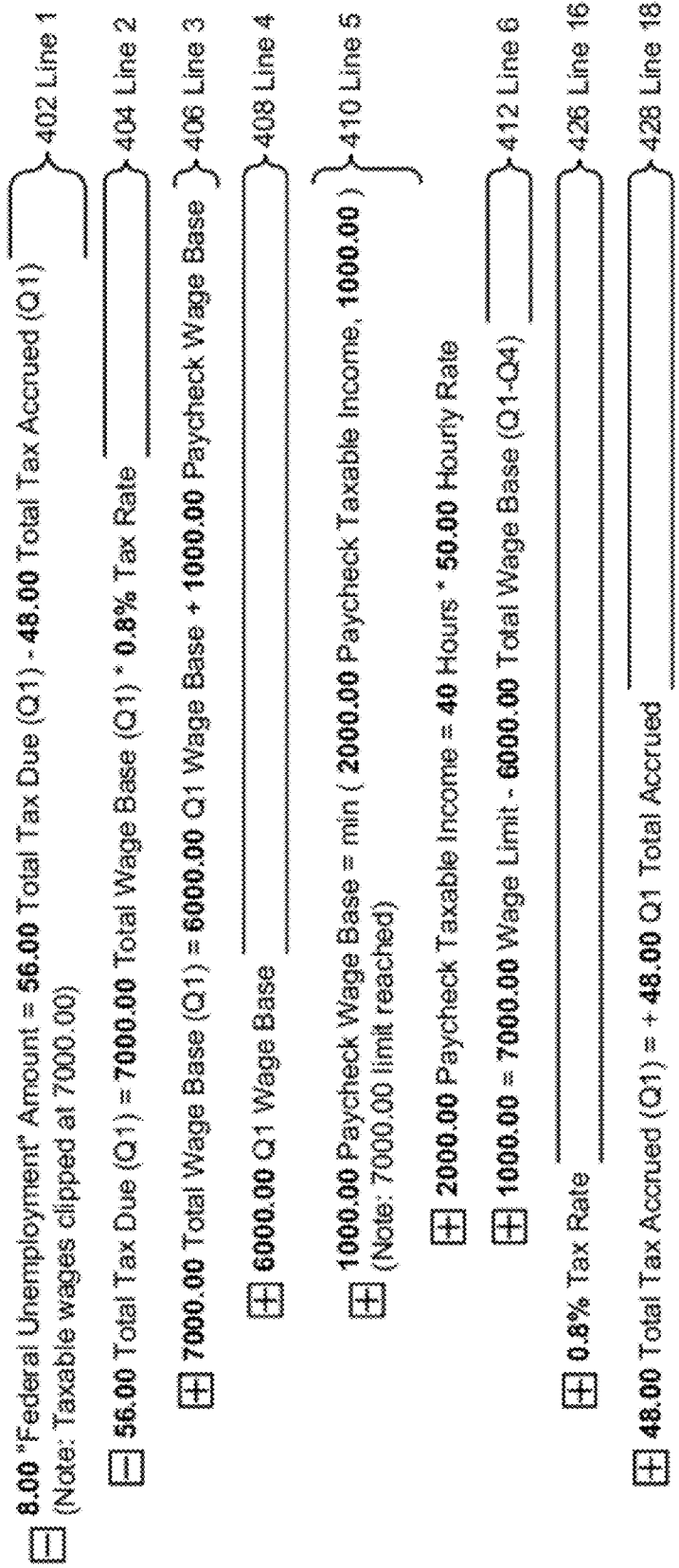

FIG. 9E shows a calculation tree after the payroll clerk expands line 5 (410) and collapses line 18 (428) in accordance with one or more embodiments of the invention. From the calculation tree shown in FIG. 9E, the payroll clerk may identify that the $1000.00 is derived from the wage limit (i.e., $7000.00) minus the total wage base for all four quarters (i.e., $6000.00) in line 6 (412). Further, as shown in FIG. 9E, by collapse line 18 (428), the calculation tree shows only what the payroll clerk wants to view.

Figure 9F:
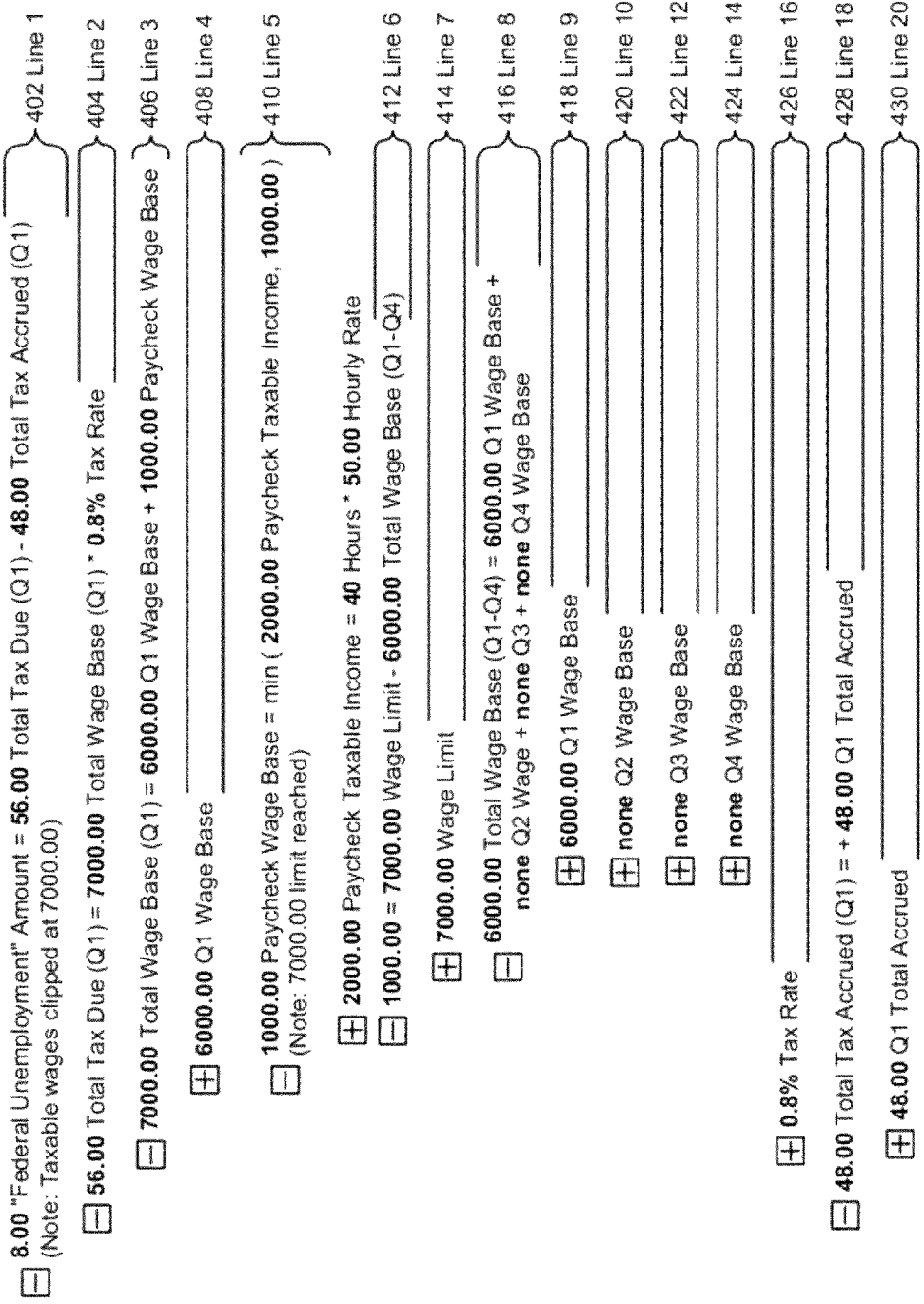

If the payroll clerk chooses to view the entire calculation tree, then the payroll clerk may select all buttons next to expandable lines. FIG. 9F shows the entire calculation tree that may be displayed for the payroll clerk. As shown in FIG. 9F, the payroll clerk may view lines 7-14 (414-424) to understand the derivation of the $1000.00 in line 6 (412).

Further, consider the scenario in which the payroll clerk questions the 0.8% tax rate in line 16 (426). Thus, the payroll clerk may expand line 16 (426) to view a list showing the Federal Unemployment Tax Item. FIG. 9G shows an example list showing the Federal Unemployment Tax Item (440) in accordance with one or more embodiments of the invention. By reviewing the list, the payroll clerk may find the company rate for federal employment (442) to determine that 0.8% is correct. Once the payroll clerk has completed reviewing the list showing the Federal Unemployment Tax Item (440), the payroll clerk may return to the complete calculation tree shown in FIG. 9F. In another scenario, the tax rate might be supplied by the company (for example a state unemployment insurance rate), in which case the payroll clerk might decide that the rate was incorrect and change it at this screen.

By reviewing and interacting with the entire calculation tree, the payroll clerk may understand the complete derivation of the federal unemployment amount in the original form. Accordingly, the payroll clerk may adjust future finances to change the amount.

Figure 10:
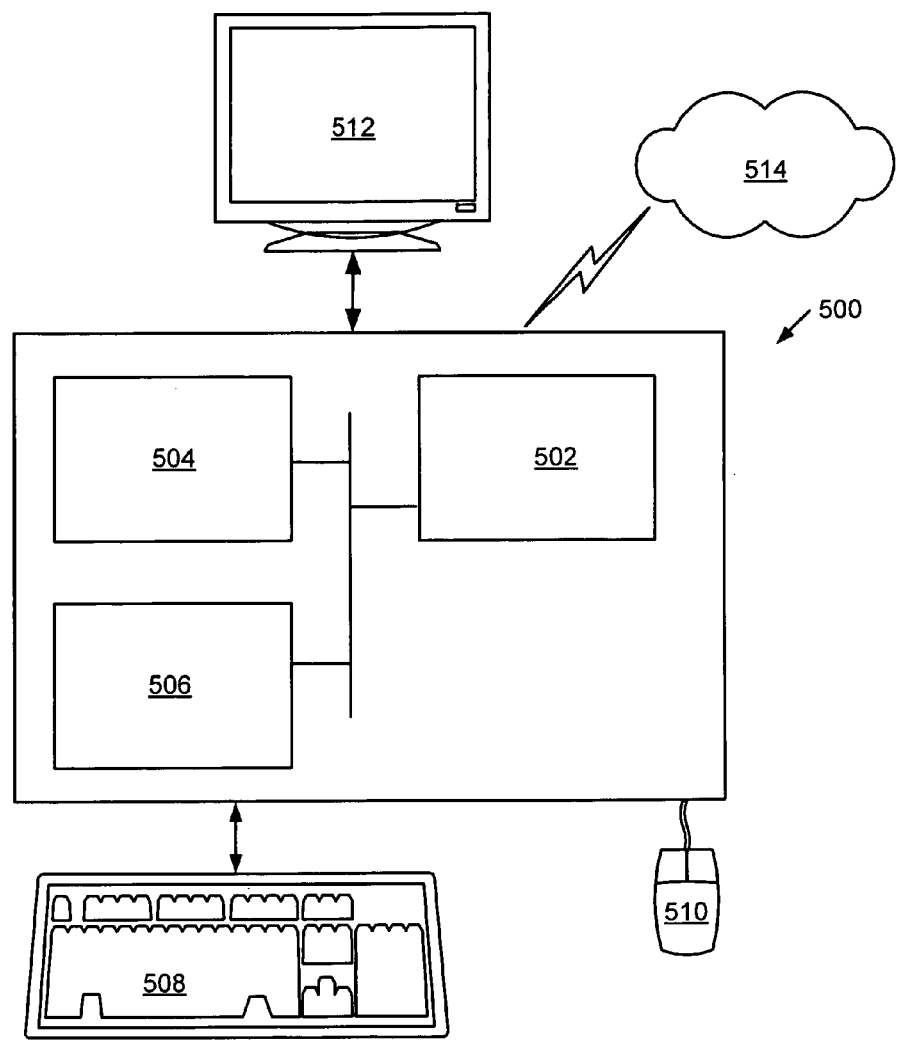
FIG. 10 shows a computer system in accordance with one or more embodiments of the invention.

Embodiments of the invention may be implemented on virtually any type of computer regardless of the platform being used. For example, as shown in FIG. 10, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include an input means, such as a keyboard (508), a mouse (510), or a microphone (not shown). Further, the computer (500) may include an output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., report generator, calculation tree engine, financial application, data repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for explaining a value of a selected field of a first form, the method comprising:
   obtaining a calculation tree for the selected field, wherein the calculation tree represents dependencies between the selected field and a plurality of precedent data elements, wherein at least one of the plurality of precedent data elements is in a second form, and wherein the second form is separate from the first form;
   obtaining a first equation associated with the selected field from the calculation tree;
   displaying a first value associated with the selected field and the first equation in symbolic form,
      wherein the first equation comprises a first precedent data element of the plurality of data elements, and
      wherein the selected field is dependent on the first precedent data element;
   receiving an expansion request for the equation associated with the selected field;
   obtaining a second equation associated with the first precedent data element from the calculation tree based on the expansion request, wherein the second equation is used to calculate the first precedent data element in the first equation;
   displaying a second value associated with the first precedent data element and the second equation with the first value and the first equation in a dependency hierarchy;
   receiving an expansion request for the second equation associated with the first precedent data element, wherein the second equation comprises a second precedent data element of the plurality of data elements;
   determining that the second precedent data element references a report; and
   displaying the report.

2. The method of claim 1, wherein the dependency hierarchy comprises a first line for the selected field and a second line for the first precedent data element, and wherein an indentation of the second line in relation to the first line represents the dependency of the selected field on the first precedent data element.

3. The method of claim 2, wherein the expansion request is a selection of a button next to the first line.

4. The method of claim 1, further comprising:
   obtaining a third equation associated with a second precedent data element of the plurality of data elements from the calculation tree based on the expansion request, wherein the first equation further comprises the second precedent data element; and
   displaying a third value associated with the second precedent data element and the third equation with the second value, the second equation, the first value, and the first equation in the dependency hierarchy.

5. The method of claim 4, further comprising:
   receiving an expansion request for the second precedent data element, wherein the third equation comprises a third precedent data element of the plurality of data elements;
   obtaining a fourth equation associated with the third precedent data element from the calculation tree based on the expansion request; and
   displaying a fourth value associated with the third precedent data element and the fourth equation with the third value, the third equation, the second value, the second equation, the first value, and the first equation in the dependency hierarchy.

6. The method of claim 5, further comprising:
   receiving a collapse request for the first equation after displaying the fourth value; and
   hiding, based on the collapse request, the fourth value, the fourth equation, the third value, the third equation, the second value, and the second equation in the dependency hierarchy.

7. The method of claim 5, further comprising:
   receiving a collapse request for the third equation after displaying the fourth value; and
   hiding, based on the collapse request, the fourth value and the fourth equation in the dependency hierarchy.

8. The method of claim 1, wherein the equation for the selected field comprises an amount and a label for each precedent data element in the first equation for the selected field.

9. The method of claim 1, wherein the amount of each precedent data element appears accentuated in the first equation for the selected field.

10. The method of claim 1, further comprising:
    displaying an annotation for the first precedent data element.

11. A system for explaining a value of a selected field of a first form, the system comprising:
    a computer processor;
    a calculation tree engine executing on the computer processor and configured for:
       generating a calculation tree for the selected field, wherein the calculation tree represents dependencies between the selected field and a plurality of precedent data elements, wherein at least one of the plurality of precedent data elements is in a second form, and wherein the second form is separate from the first form; and
    a graphical user interface executing on the computer processor and configured to:
       obtain a first equation associated with the selected field from the calculation tree;
       display a first value associated with the selected field and the first equation in symbolic form,
          wherein the first equation comprises a first precedent data element of the plurality of data elements, and
          wherein the selected field is dependent on the first precedent data element;
       receive an expansion request for the equation associated with the selected field;
       obtain a second equation associated with the first precedent data element from the calculation tree based on the expansion request, wherein the second equation is used to calculate the first precedent data element in the first equation;
       display a second value associated with the first precedent data element and the second equation with the first value and the first equation in a dependency hierarchy;

receive an expansion request for the second equation associated with the first precedent data element, wherein the second equation comprises a second precedent data element of the plurality of data elements;

determine that the second precedent data element references a report; and display the report.

12. The system of claim 11, wherein the dependency hierarchy comprises a first line for the selected field and a second line for the first precedent data element, and wherein an indentation of the second line in relation to the first line represents the dependency of the selected field on the first precedent data element.

13. The system of claim 12, wherein the expansion request is a selection of a button next to the first line.

14. The system of claim 11, wherein the graphical user interface is further configured to:

obtain a third equation associated with a second precedent data element of the plurality of data elements from the calculation tree based on the expansion request, wherein the first equation further comprises the second precedent data element; and display a third value associated with the second precedent data element and the third equation with the second value, the second equation, the first value, and the first equation in the dependency hierarchy.

15. The system of claim 14, wherein the graphical user interface is further configured to:

receive an expansion request for the second precedent data element, wherein the third equation comprises a third precedent data element of the plurality of data elements;

obtain a fourth equation associated with the third precedent data element from the calculation tree based on the expansion request; and display a fourth value associated with the third precedent data element and the fourth equation with the third value, the third equation, the second value, the second equation, the first value, and the first equation in the dependency hierarchy.

16. The system of claim 15, wherein the graphical user interface is further configured to:

receive a collapse request for the first equation after displaying the fourth value; and hide, based on the collapse request, the fourth value, the fourth equation, the third value, the third equation, the second value, and the second equation in the dependency hierarchy.

17. The system of claim 15, wherein the graphical user interface is further configured to:

receive a collapse request for the third equation after displaying the fourth value; and hide, based on the collapse request, the fourth value and the fourth equation in the dependency hierarchy.

18. The system of claim 11, wherein the equation for the selected field comprises an amount and a label for each precedent data element in the first equation for the selected field.

19. The system of claim 11, wherein the amount of each precedent data element appears accentuated in the first equation for the selected field.

20. The system of claim 11, wherein the graphical user interface is further configured to:

display an annotation for the first precedent data element.

21. A non-transitory computer readable medium comprising computer readable program code embodied therein for causing a computer system to:

obtain a calculation tree for a selected field in a first form, wherein the calculation tree represents dependencies between the selected field and a plurality of precedent data elements, wherein at least one of the plurality of precedent data elements is in a second form, and wherein the second form is separate from the first form;

obtain a first equation associated with the selected field from the calculation tree;

display a first value associated with the selected field and the first equation in symbolic form, wherein the first equation comprises a first precedent data element of the plurality of data elements, and wherein the selected field is dependent on the first precedent data element;

receive an expansion request for the equation associated with the selected field;

obtain a second equation associated with the first precedent data element from the calculation tree based on the expansion request, wherein the second equation is used to calculate the first precedent data element in the first equation;

display a second value associated with the first precedent data element and the second equation with the first value and the first equation in a dependency hierarchy;

receive an expansion request for the second equation associated with the first precedent data element, wherein the second equation comprises a second precedent data element of the plurality of data elements;

determine that the second precedent data element references a report; and display the report.

22. The non-transitory computer readable medium of claim 21, wherein the dependency hierarchy comprises a first line for the selected field and a second line for the first precedent data element, and wherein an indentation of the second line in relation to the first line represents the dependency of the selected field on the first precedent data element.

23. The non-transitory computer readable medium of claim 21, wherein computer readable program code further causes a computer system to:

obtaining a third equation associated with a second precedent data element of the plurality of data elements from the calculation tree based on the expansion request, wherein the first equation further comprises the second precedent data element; and displaying a third value associated with the second precedent data element and the third equation with the second value, the second equation, the first value, and the first equation in the dependency hierarchy.

24. The non-transitory computer readable medium of claim 23, wherein computer readable program code further causes a computer system to:

receive an expansion request for the second precedent data element, wherein the third equation comprises a third precedent data element of the plurality of data elements;

obtain a fourth equation associated with the third precedent data element from the calculation tree based on the expansion request; and display a fourth value associated with the third precedent data element and the fourth equation with the third value, the third equation, the second value, the second equation, the first value, and the first equation in the dependency hierarchy.

25. The non-transitory computer readable medium of claim 24, wherein computer readable program code further causes a computer system to:

receive a collapse request for the first equation after displaying the fourth value; and hide, based on the collapse request, the fourth value, the fourth equation, the third value, the third equation, the second value, and the second equation in the dependency hierarchy.

* * * * *